Feb. 7, 1956 D. E. HOOKER 2,734,166
GALVANOMETRIC DEVICE AND CIRCUIT
Filed Nov. 8, 1952 2 Sheets-Sheet 1
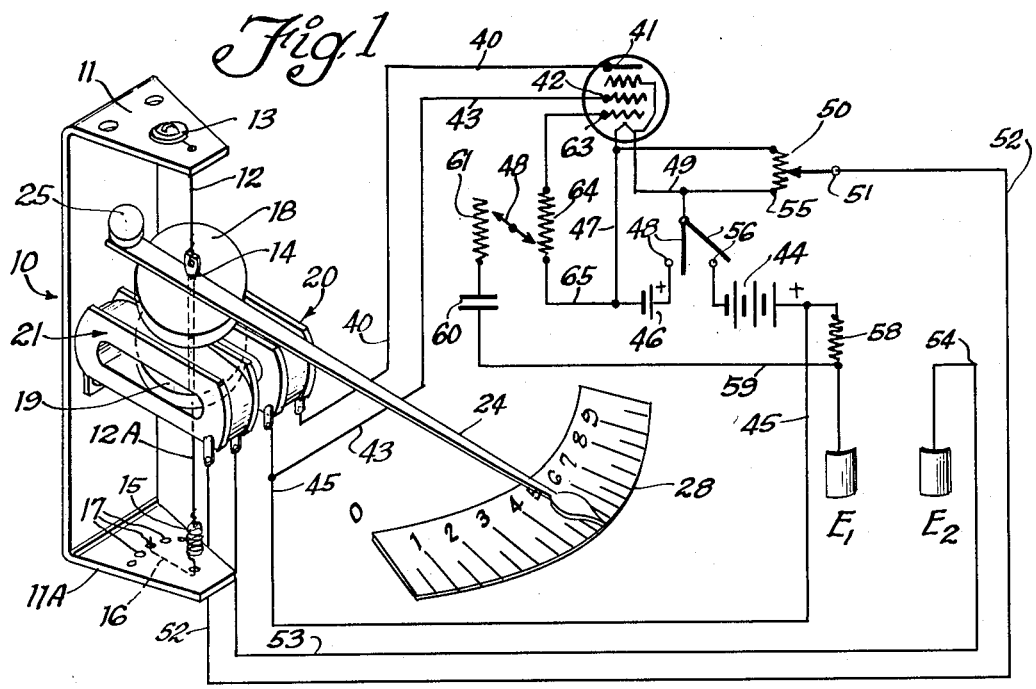
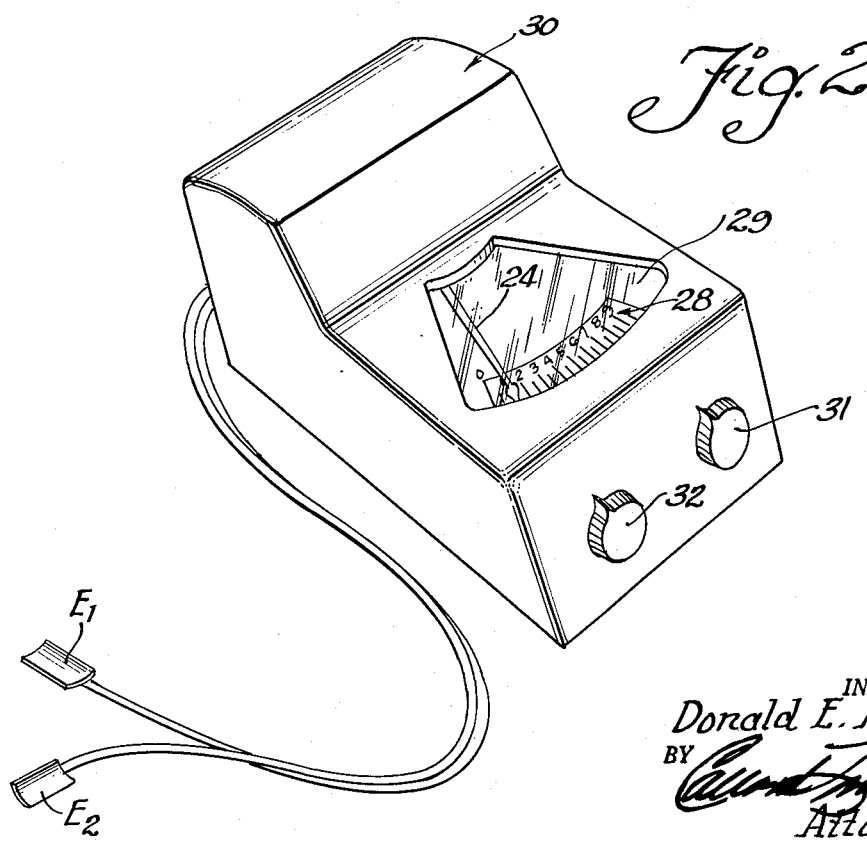
INVENTOR.
Donald E. Hooker
BY
Attorney Feb. 7, 1956 D. E. HOOKER 2,734,166
GALVANOMETRIC DEVICE AND CIRCUIT
Filed Nov. 8, 1952 2 Sheets-Sheet 2

INVENTOR.
Donald E. Hooker
BY
Attorney

United States Patent Office 2,734,166
Patented Feb. 7, 1956

2,734,166

GALVANOMETRIC DEVICE AND CIRCUIT

Donald E. Hooker, Skokie, Ill., assignor to
Raymond T. Moloney, Chicago, Ill.

Application November 8, 1952, Serial No. 319,471

9 Claims. (Cl. 324—62)

The principal object of the present disclosure is the provision of an improved galvanometric device, including a sensitive circuit therefor, for detection and measurement of small currents, especially bio-currents, by which is particularly meant electric currents originating or created in biological test subjects, mainly human beings.

Another object is the provision of a highly sensitive galvanometer and detecting circuit therefor of general application, but especially contrived for use in connection with so-called lie-detectors.

Another object is the provision of a highly sensitive but inexpensive galvanometer of the suspension type.

A further object is the provision of a simple, relatively inexpensive, portable galvanometric device and detecting circuit adapted to sense changes in resistance arising under certain conditions across terminals connected to the body of a living human being.

Additional objects and aspects of novelty and utility characterizing the invention pertain to details of construction and operation of the embodiment described hereinafter in view of the annexed drawings, in which:

Fig. 1 is a circuit diagram with the novel galvanometer movement thereof shown in perspective;

Fig. 2 is a perspective view of a portable galvanometric detecting unit utilizing the apparatus of Fig. 1;

Figure 3:
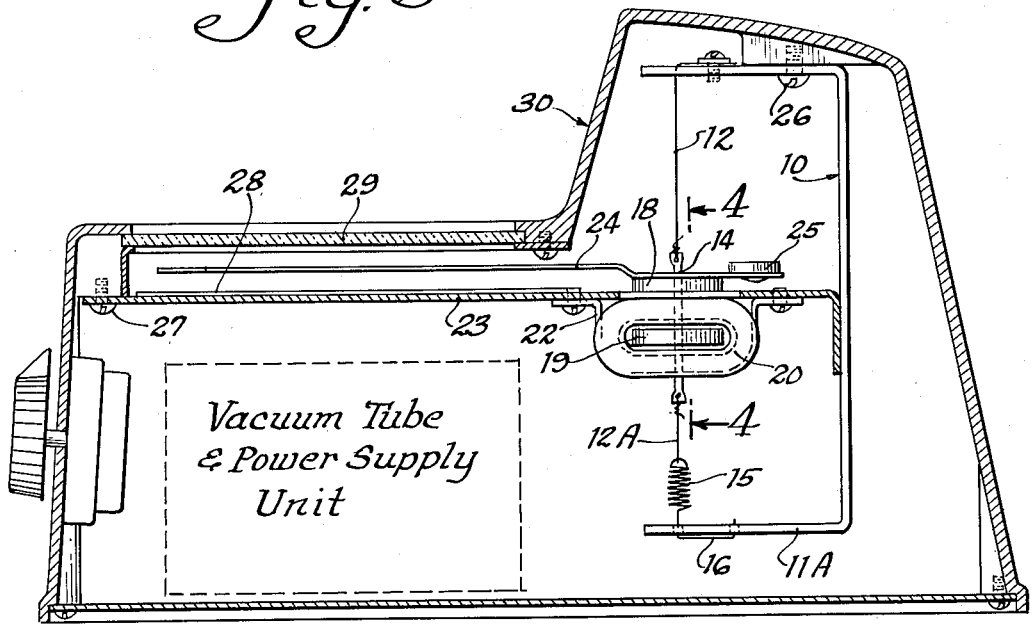
Fig. 3 is a median, longitudinal cross-section through the unit of Fig. 2.

The device disclosed herein has features of general application; however, it is intended primarily for use as a so-called lie-detector, by which is meant one of the several types of apparatus for detecting and indicating certain changes which have been found to occur in the respiratory rate, conductivity, etc., of the human body under controlled conditions in which the subject, in response to questions put to him, gives answers which he knows to be, or intends to be, incorrect.

While the present disclosures do not purport to assert or explain any theories bearing upon the merits of any so-called lie-detection apparatus, as such, including the devices herein described; it has been found that the detection means shown in Fig. 1, for example, is highly effective in indicating a change in body resistance of a patient or subject being tested under conditions where a false, incorrect or untrue response is knowingly and deliberately given in response to a question presented to the subject, the correct answer to which is known to the subject, at least.

The galvanometer depicted in Fig. 1 is a highly important element of the detection unit, and consists of a U-shaped bracket 10 having suspended from an upper arm 11 thereof a filament 12 attached to the arm by means of a hold-down washer and screw 13. The filament passes through a small hole in the bracket arm and downwardly for attachment to the upper end of an aluminum spindle 14, the lower end of which is likewise connected to an end of another filament 12A, the free end of the latter being attached to a coil spring 15 having an extended leg 16 offset to project selectively into any of a series of radially located holes 17 in the lower bracket arm 11A.

Carried on the spindle 14 are two cylindrical magnets 18 and 19 arranged one above the another (as in Figs. 3 and 4) with their respective poles forming in effect a closed local magnetic field so as to minimize effects from the terrestrial field; that is, the north-seeking pole of magnetic disc 18 is aligned with the south-seeking pole of the companion disc 19.

A pair of elongated field coils 20 and 21 is situated on opposite sides of the lower disc magnet 19 (Figs. 1 and 4) so that about one-half of the disc projects into the bore of each of the coils 20 and 21; while each of the halves of the upper disc 18 overlies an upper side of one of the coils 20 or 21.

The two field coils are preferably attached by nonferrous straps 22 (Fig. 3) to a non-ferrous arm 23, which in turn is secured to the bracket 10.

As in Figs. 1 and 3, a light-weight pointer 24 is secured on the top face of the disc magnet 18 by a suitable adhesive, and is provided with a small counterweight 25.

The galvanometer (and circuit means therefor) is housed in a portable casing 30 (such as shown in Figs 2 and 3), the bracket 10 being preferably secured to the top of the casing by means of a screw 26 threaded into a boss thereon, while the forward end of the arm 23 is similarly secured to the case by means of screw 27. A card, having thereon a reference scale 28, is carried on the arm 23 beneath a glass window 29. For simplicity, the circuit components have been omitted from the interior of the casing of Fig. 3.

Figures 4, 5:
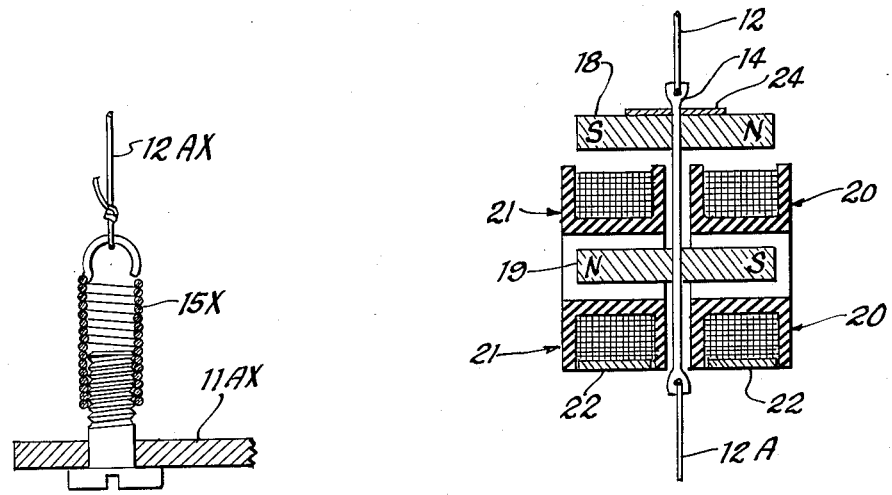
Fig. 4 is an enlarged cross-sectional detail taken through the galvanometer movement along lines 4—4 of Fig. 3.
Fig. 5 is an enlarged detail, partly in section, of a modified filament-tensioning and zeroing means.

A modified tensioning and zeroing spring 15X is shown in Fig. 5 for attachment to the lower filament piece 12AX, an adjusting screw 16X being loosely or freely passed through the lower bracket arm 11AX and threaded into the convolutions of the spring. By turning the adjusting screw in its loose seat in the bracket arm the spring and the attached filament can be turned to dispose the point at a desired angular position relative to the scale 28; also, by holding the spring fast and threading the screw in or out of same it is possible to tension or relax the filament. The two field coils 18 and 19 of the galvanometer are connected into different branches of the circuit shown in Fig. 1, and serve respectively as deflecting and balancing means for controlling the angular movements of the magnetic discs, as will more fully appear hereafter.

Referring to Fig. 1, the patient or subject to be tested is connected into the test circuit by means of a pair of small curved finger electrodes $E_1$ and $E_2$ (see also Fig. 2), which are respectively fitted onto one of the fingers of each of the subject's hands, usually the index finger, and these electrodes are held tightly engaged with the fingers by means of adhesive tape (not illustrated), so that disturbing movements of the electrodes relative to the skin surface are minimized.

A potential of about 45 volts D. C., maximum, is connected across these electrodes $E_1$—$E_2$ and therefore acts across the body resistance of the subject referred to said electrodes, and a slight current will flow in the electrode circuit. A change in said body resistance, after the testing current has been established and balanced, will be referred to one of the two field coils 20 and result in deflection of the galvanometer pointer, as will now be made to appear.

The deflecting coil 20 has one of its terminals connected by conductor 40 to the plate 41 of a vacuum tube, preferably a pentode, having a screen grid 42 connected by conductor 43 to the remaining terminal of deflecting coil 20. The positive terminal of a plate supply battery 44 of about 45 volts is connected by conductor 45 to the remaining terminal of the deflecting coil 20 and through the latter and conductor 40 feeds the plate 41, while the screen grid has the plate voltage applied directly from conductor 45.

The tube filament is energized from battery 46, conductor 47, switch contacts 48 (closed) and conductor 49; and it may be observed here that this filament supply circuit is shunted by potentiometer resistance 50, the variable contactor 51 of which is connected by conductor 52 to one terminal of the galvanometer balancing coil 21, while the remaining terminal of this coil connects via conductor 53 to the test electrode $E_2$, at junction 54, and to one terminal of the filament-cathode circuit at junction 55.

Switch contacts 56, in common with contacts 48, connect the negative terminal of the plate supply battery 44 to the positive terminal of the filament battery 46, so that in effect (with switch means 46—56 closed) the test electrode $E_2$ is connected to the negative side of the plate supply battery. The companion test electrode $E_1$ is connected through a load resister 58 to the positive terminal of the plate battery 44, so that it will be apparent that the two test electrodes are placed across the 45-volt supply through a series load resistor, the value of which is about 100,000 ohms.

The drop side of the load resistor 58 is connected via conductor 59 to one terminal of a blocking condenser 60, having a capacity of about 1 mfd., and the remaining condenser terminal connects to a resistor 61, of about 5 megohms value.

The control grid 63 connects through another 5 megohm resistance 64 and conductor 65 to the filament or cathode conductor 47; and a variable contactor 48, common to the two resistances 61 and 64, completes the signal or deflection circuit connection from the condenser and electrode $E_1$ to the control grid.

It will now appear that the galvanometer deflecting coil 20 is traversed by the plate current and tends to set up a deflecting field proportional to such current, with a consequent deflection of the magnetic discs 18 and 19 accordingly.

Moreover, the two test electrodes $E_1$—$E_2$ apply a test voltage to the body of the subject under test, and this current acts through the load resistor 58.

However, the galvanometer deflection arising from the plate current is to be balanced out by an applied voltage derived from the filament supply circuit and battery 46; and this is accomplished by adjusting the balancing potentiometer 50, the resistance of which is about 500 ohms, maximum. For this purpose the resistance of the balancing coil 21 is about 350 ohms, while that of the deflecting coil is about 8,000 ohms.

Assuming that there is a subject connected across the test electrodes $E_1$—$E_2$, as aforesaid, and that the galvanometer circuit is operating and balanced, as by adjustment of potentiometer contactor 51, the pointer 24 is brought to a condition of substantial rest at the low end of the scale, and may thus be said to be zeroed-in for the particular value of body resistance of the subject under test. This value will be slightly different from one person to another, and will be affected by conditions of relative humidity, or the moisture on the fingers, and other factors, so that the device must be adjusted or zeroed-in for each subject under test.

Having effected such an adjustment, the subject is questioned and the galvanometer pointer 24 observed for deflections as the answers are given.

In controlled experiments, a reaction will be observed in about 80% of the cases where wrong answers are knowingly or deliberately given, and the galvanometer needle in such instances will be deflected in varying amounts toward the higher end of the scale.

It is considered, without asserting it as a limiting theory, that in such cases the electrical body resistance of the subject drops, as a function of the subject's reaction in giving a false or deliberately wrong answer, which is tantamount to a drop in the applied resistance across the test electrodes $E_1$—$E_2$, with the result that there is a momentary change in the voltage applied across the control grid circuit, and a negative pulse is in effect applied to the control grid 63 from condenser 60, resulting in a drop in the plate current, and hence in the strength of the deflecting field set up by the galvanometer coil 21, so that the opposing field of the balancing coil deflects the magnet system and pointer toward the higher end of the scale.

In general, the amount of such deflection is proportional to the degree of change in body resistance; and it is found that such body resistance changes usually persist for periods varying between 10 to 60 seconds, followed by reversion to a value close to that existing before the change occurred, so that usually it is not necessary to readjust or balance the galvanometer after successive test reactions, it being simply necessary to pause long enough for the body resistance to be restored to the initial condition; and in this connection it is not necessary that the galvanometer be brought to any precise zero position, although the maximum sensitivity to slight test changes is afforded when the opposing fields of the two coils 20 and 21 are substantially of equal intensity, i. e. fully balancing.

When the electrodes $E_1$ and $E_2$ are connected, as aforesaid, to a human subject, the galvanometer means and detecting circuit, balanced as described, will respond to and indicate changes of a respiratory nature brought about by coughing or abruptly deep breathing, to cite two examples; and there is evidence to support a theory that the changes thus effected at the test electrodes represent a change in applied or test-load resistance, rather than changes due to bio-currents originating in the subject under test.

The vacuum tube employed is preferably a type 1U4 pentode requiring a low-drain filament battery 46 of only 1.5 volts potential, and capable of operating on a miniature type B battery 44 of only 45 volts potential to provide a working current of about 250 to 500 microamperes. All of the circuit components, including the vacuum tube, batteries 44, 46, the several potentiometers, resistors, etc., are to be housed in the extra space provided in the casing 30 as it appears in Fig. 3, so that the testing unit as it appears in Fig. 2 will be entirely self-contained and portable, with knobs 31 and 32 for respectively varying the potentiometer contactors 48 and 50. The switch means may be operated by either of the contactors 48 or 50 in accordance with known practices in this respect.

In the usual operation of the device, the galvanometer movement is generally biased by torque in the suspensory filament means 12—12a to bring the pointer 24 toward the zero- or lower-reading end of the scale, this being accomplished by turning the spring 15 accordingly. The suspension filament means is preferably a synthetic thread of extruded viscose material; but a more accurate instrument may be had by using any of the phosphor-bronze or like metal ribbons available for the purpose, in case the instrument is to be used for measuring, as well as indicating purposes.

It will be understood that while the testing device is particularly adapted to use as a form of so-called lie-detector, it is capable of more general applications in detecting and indicating slight changes in electrical resistance or voltage or current parameters applied at the test electrodes and which can be balanced, as aforesaid, and will act to unbalance the deflecting coil fields in the manner and for the purpose set forth.

Various types of apparatus are known in the art for detecting and indicating changes of electrical character in human subjects, either as a function of respiratory phenomena, bio-currents, or resistivity; but, so far as is known, all such prior devices are of complicated and expensive nature, usually requiring involved multi-stage electronic amplifying equipment and elaborate control means therefor, whereas the apparatus herein disclosed is highly sensitive, simple, relatively inexpensive, portable, and easily operated, and gives indicating results of such consistency as to be useful in place of more costly apparatus for analogous purposes.

The galvanometer movement, meaning the moving system thereof including the magnetic discs and pointer, will respond to a deflecting differential or imbalance between the deflecting and balancing field currents of as little as 10 microamperes, where the magnetic discs are made of the highly efficient magnetic alloys now available, such, for example, as the aluminum-nickel-cobalt-iron alloys, and others having high retentivity and coercive force.

It will thus appear that the invention affords a portable galvanometric testing device including a galvanometer having a polarized moving element; a pair of oppositely-poled deflecting coils therefor; a deflecting circuit connected to provide a current through one of these coils; a balancing circuit with adjustable potential for providing an opposing current in the other coil so that the galvanometer can be balanced to a starting or indexed reference condition in which the magnetic fields of the two coils tend to balance each other out; and a sensing circuit connected to modify the deflecting current, for example, so as to produce imbalance and a differential deflecting field so that the galvanometer movement is subjected to indicating torque; the sensing circuit including electrodes or like means adapted to be connected to a test subject or load effective to modify the deflecting current and produce the aforesaid galvanometer imbalance.

I claim:

1. A galvanometer and circuit for detection and indication of resistance changes in a test connection across a pair of test electrodes, said circuit comprising a vacuum tube having at least a control grid, a plate, and a cathode, and a galvanometer having a polarized indicating movement, a deflection coil for setting up a deflecting field for said movement, and a balancing coil for setting up a balancing field to oppose the deflecting action of said deflecting coil upon said movement; a deflecting circuit including said plate and deflection coil in series with a source of plate voltage and said cathode; a balancing circuit including a source of balancing voltage and adjustable voltage-dividing means connected with said balancing coil to provide a balancing field of selective intensity, and a sensing grid circuit including a pair of electrodes connected with a source of test potential, one of said electrodes also having connection with said cathode, and the other of said electrodes having connection with said control grid to apply a plate-current modifying potential thereto responsive to alteration of the value of a tested resistance connected across said test electrodes to unbalance the balanced fields of said deflecting and balancing coils and produce an indicating action of said galvanometer movement.

2. A circuit according to claim 1 in which said source of test potential is the same as said plate voltage.

3. A circuit according to claim 1 in which said cathode includes a current-heated filament and said source of balancing voltage is connected to said filament to supply heating current thereto.

4. A circuit according to claim 3 further characterized in that said grid is connected to said other electrode through a capacity and resistance means in poled relation to said test potential to apply a negative sensing potential to said grid responsive change in value of the tested resistance as aforesaid.

5. A circuit according to claim 1 in which said galvanometer movement includes a pair of diametrically magnetized discs rotatively suspended in parallelism, one above another, by a filament, and said deflecting and balancing coils are solenoids placed with their bores in alignment radially on opposite sides of said filament and one of said discs with about one-half of said one disc projecting into the bore of each said coil; said coils being connected in said circuit so that the respective fields thereof act upon said discs in opposing polarity.

6. In a psychometric galvanometric device, a galvanometer having two deflecting coils arranged and connected to act in opposition, an electronic valve device having at least a cathod, an anode, and a control electrode; a source of operating potential for said anode having one terminal connected to said anode through a first one of said deflecting coils, and a remaining terminal connecting with said cathode; whereby said first coil is traversed by anode current; the second one of said deflector coils being connected in series with said cathode and a first body test electrode; a second body test electrode having connection with said control electrode and also with said anode source at a point of potential substantially higher than said cathode, whereby a test potential is applied to said electrode from the same source of potential supplying said anode, and one of said coils is traversed by anode current while the other is traversed by any body current through test electrodes and in a direction opposite to the current through said first coil.

7. Apparatus according to claim 6 in which said control electrode is connected through a capacity with the second test electrode whereby to apply a control potential to said control electrode which is opposite in sign from the potential at which said capacity connects with said source of anode operating potential.

8. Apparatus according to claim 7 in which said cathode is of the current heated variety and is provided with a source of heating voltage, and said second deflector coil connects with said cathode through a voltage divider in shunt with said heating voltage.

9. In a galvanometric testing apparatus for sensing resistance changes in a subject under test, a thermionic tube having at least an electrically heated cathode, an anode, and a control electrode; a source of anode voltage connected to act across said anode and cathode; a source of cathode heating voltage connected to heat said cathode; a galvanometer having first and second deflector coils with opposing fields, a first one of the same being connected in the anode circuit of said tube to be traversed by anode current, and the second said coil being connected in a test circuit comprising a pair of test terminals one of which is connected to one terminal of said last-mentioned and second deflector coil, the remaining terminal of which coil is connected with said cathode; the second one of said test terminals being connected with the positive terminal of said anode voltage; a resistance to be tested being adapted to be shunted across said test terminals, under which circumstances said second deflector coil is traversed by a current derived in part, at least, from said cathode heating voltage, while the first deflector coil is traversed by anode current, said coil currents acting to set up the opposing fields aforesaid.

References Cited in the file of this patent

UNITED STATES PATENTS

| 1,915,028 | Meyer-Jagenberg | June 20, 1933 |
| 1,966,185 | Preisman | July 10, 1934 |

FOREIGN PATENTS

| 268,453 | Great Britain | Apr. 5, 1927 |

OTHER REFERENCES

"Tubes at Work," article in "Electronics" of April 1945 (page 192).